Sept. 27, 1966   J. D. NILLES   3,275,238

VIBRATION DAMPING PNEUMATIC CONTROL DEVICE

Filed Sept. 25, 1964

INVENTOR.
JOHN D. NILLES
BY *Alfred N. Feldman*
ATTORNEY 3,275,238
VIBRATION DAMPING PNEUMATIC
CONTROL DEVICE
John D. Nilles, Roselle, Ill., assignor to Honeywell Inc., a corporation of Delaware
Filed Sept. 25, 1964, Ser. No. 399,266
6 Claims. (Cl. 236—87)

The present invention is directed to a pneumatic condition responsive device of an improved type, more specifically, the invention is directed to a means of damping vibrations that occur at the natural resonant frequency that exists in most pneumatic devices.

Most pneumatic condition control devices utilize some type of condition responsive element that operates a valve or nozzle means to control the flow of air in a system. The control of the air provides a continuous means of applying varying air pressure to a pneumatic actuator that in turn performs the actual work of the control system. In order that the valve or nozzle means be movable in response to a condition, the condition responsive means and the valve or nozzle means form a rather delicately balanced movable assembly. This type of an arrangement inherently has a natural resonant frequency. In most pneumatic devices the inherent natural resonant frequency is near the operating point of the control device and in many of the pneumatic control devices vibrations occur that are undesired and which must be damped out. The vibration normally occurs during the valving function and is a result of the movement of the responsive means and the valve or nozzle means to valve the appropriate flow of air through the control device. The prior art methods of obtaining damping have been through the means of adding weights, dampers, or other mechanical devices directly to the condition responsive section or valve section of the unit to damp out any vibrations that occur in the unit. This inherently reduces the sensitivity of the control device and also adds appreciably to the expense of the manufacturing of the control device.

In the present invention, a pneumatic control device is provided with a damping device that in no way mechanically loads the condition responsive section or valve means nor does it add to the cost of the manufacture.

It is a primary object of the present invention to disclose a pneumatic condition responsive device that has a tendency to vibrate at a natural resonant frequency and wherein the generated vibrational waves are damped out by the use of a chamber in the input air supply for the device.

It is a further object of the present invention to disclose a pneumatic condition responsive device that has any self-generated vibrations damped out by the use of a chamber formed by the input air tube and an associated air filter.

Yet another object of the present invention is to disclose a pneumatic thermostat that utilizes its usual input air tube and filter as a vibrational damper thereby avoiding the need of adding any additional cost to the device over that inherent in its normal manufacture.

These and other objects of the present invention will become apparent when the drawings are considered with the detailed specification, wherein.

Figure 1:
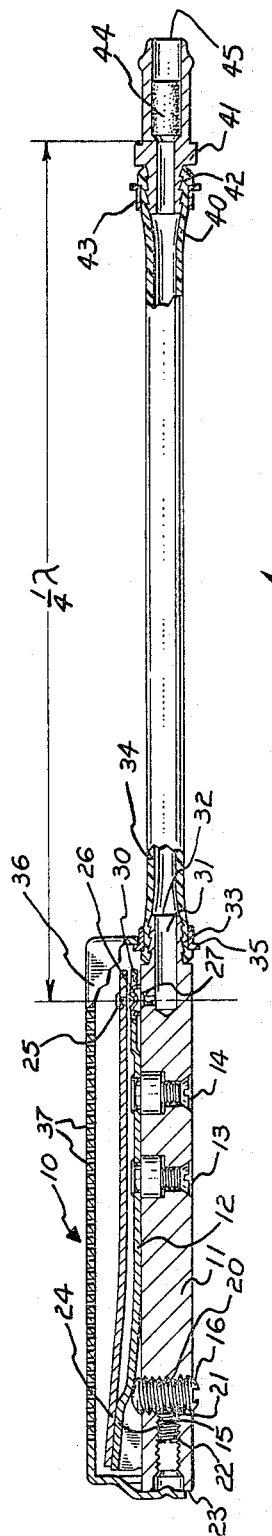
FIGURE 1 is a cross section of a pneumatic thermostat incorporating the invention in one embodiment.

In FIGURE 1 there is disclosed a simple condition responsive means in the form of a bimetal operated thermostat. The condition responsive means is disclosed at 10 and includes a metal base 11 to which is mounted a plate 12 by means of a pair of screws 13 and 14. The plate 12 has an end or upward projection 15 that rides on a setscrew 16. The setscrew 16 is threaded at 20 into the base 11. A second setscrew 21 is threaded at 22 into the end 23 of the base 11. The setscrew 21 acts as a locking mechanism on the setscrew 16. Setscrew 16 is used to raise or lower the end 15 of the plate 12 for adjustment purposes.

Spot welded to the end 15 of the plate 12 is a bimetal 24. The bimetal 24 extends generally coextensively with the plate 12 and has at the end remote from the projection 15 a spear-like pivot 25 staked through the bimetal 24. The pivot 25 applies pressure to a cup-like flapper 26 that covers an orifice or nozzle 27. The nozzle or orifice 27 combined with the cup-shaped member 26 form a valve means or nozzle means for control of air flow, as will be noted. The cup-like member 26 is held generally in place by passing through a hole 30 in the end of the support plate 12. The hole 30 is quite loose in fit and merely holds the cup 26 in general alignment over the orifice 27. The orifice 27 is connected to a drilled hole 31 that intersects with the orifice 27. The drilled hole 31 is in end 32 of the base 11 and the end 32 forms an inlet for the condition responsive means 10. The end 32 has a number of offset ribs 33 which receive a plastic tube 34. The plastic tube 34 is locked in position by a ring 35 thereby making an air tight seal with the end 32 of the condition responsive means 10. A cover 36 having a number of perforations 37 fit over the bimetal 24 and clamp on the base 11 thereby providing a cover for the device which allows free air flow from the ambient to which the condition control means 10 is exposed.

The tube 34 is joined at end 40 to a tube fitting 41 by passing over a group of ridges 42 and is locked by a ring 43. Contained in the fitting 41 is a filter 44 that is in this case formed of a felt like material. The filter allows free air flow to enter the end 45 of fitting 41 and the air passes through the filter 44 from the end 45 to the tube 34. The only requisite of the filter is that it be made of a material of such a density so as to provide a restriction to air flow.

Figure 2:
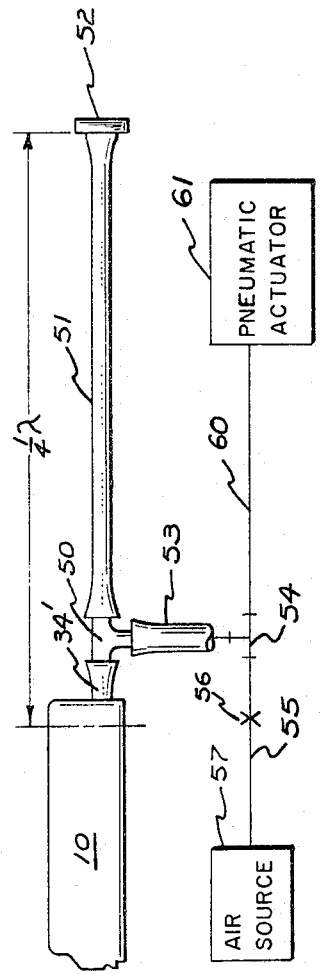
FIGURE 2 is a schematic representation of a second embodiment of the device disclosing a complete pneumatic control system.

The condition responsive device 10 and the tubing 34 along with the fittings 41 form a conventional pneumatic bleed type of thermostat wherein air passes into the inlet 45 and is bled through the orifice 27 by operation of the bimetal 24 in response to temperature. In FIGURE 2 a system utilizing this concept is disclosed and it will be described in some detail after an explanation of the point of novelty of the device of FIGURE 1. It would appear that the device of FIGURE 1 was conventional, but one factor has been added to FIGURE 1 which is unique.

The unique feature of FIGURE 1 is in the selection of the length of tubing 34 along with the rest of the components structure. Tubing 34 is selected so that the distance between the center of the nozzle 27 and the face of the filter 44 equals one-quarter of a wave length $\lambda$ of the natural resonant frequency of vibration of the condition responsive means including the bimetal 24 and the cup-like member 26. In a normal pneumatic control device the natural resonant frequency is a function of the general structure and can be readily determined. Once the resonant frequency has been determined, the wave length of this frequency can also be readily determined by conventional and well known means. By selecting the tube 34 so that the distance between the nozzle center 27 and the face of the filter 44 is one-quarter wave length, a unique function occurs. Any vibration created at the natural resonant frequency travels down the tube 34 until it reaches the filter 44.

When the vibration reaches the filter 44 it is reflected back to the left end tubing 34 to the orifice 27. When the reflected vibration reaches the orifice 27, it is 180° out of phase with the natural resonant frequency vibration. Since the two vibrations are 180° out of phase with one another, they tend to cancel one another out.

While the device described is specifically referenced to the length between the nozzle 27 and the face of filter 44 as being ¼ of a wave length in length, any odd quarter wave length will give the same effect. For example, ¼ wave length, ¾ wave length, 1¼ wave length, 1¾ wave length, etc. will have the same effect. Within the scope of the present application, any reference to any odd quarter wave length is the equivalent of the ¼ wave length or any of the previously referenced fractions. Also, reference to the natural resonant frequency is generic to the fundamental frequency and all of its related harmonics.

Test results on a number of devices of the type disclosed have proved that the natural resonant frequency from device to device is quite consistent and that by the selection of the length of tubing 34, it is possible to provide a pneumatic condition responsive device that inherently damps out any vibrations which are generated that otherwise create an objectional noise. Since the tube 34 must be connected to the condition responsive device 10 in order to make a device suitable for normal installation, the selection of its length creates no additional burden from either a manufacturing, installation, or cost standpoint. Since many devices have the tubing supplied with them, it is a simple matter for the manufacturer of the condition responsive device disclosed to attach a tube of the proper length thereby providing the damping function at no additional expense over the device as it would ordinarily be supplied. It has been found that in a device of the tube specifically disclosed, that a tube of approximately seven inches in length provides the novel damping function.

In FIGURE 2 a slightly different configuration of the device is disclosed. A condition responsive means 10 is once again disclosed connected to a pipe 34'. In this particular case, pipe 34' has a T 50 which in turn is connected to a pipe 51 that is closed at 52 by a fixed dead ending member. The T 50 is then connected by pipe 53 to another T 54. T 54 is fed by pipe 55 through a conventional restriction 56 from an air source 57. The T 54 supplies an output pressure on pipe 60 to a pneumatic actuator 61. The system just disclosed is a conventional pneumatic bleed system where an air source 57 supplies air through an orifice 56 to a pneumatic actuator 61 and to a condition responsive device 10. The difference between FIGURE 2 and a conventional system is in the addition of the T 50 and the length of tube 51 that is dead ended at 52. The selection of the length 34', the T 50, and the pipe 51 to the closed end 52 is selected at the one-quarter wave length distance for the natural resonant frequency of the condition responsive means 10. Once again, any vibrational waves that are generated by the natural vibration of the condition responsive means 10 are reflected down the chamber formed by the tube 34', the T 50 and the tube 51 where the wave is reflected back by the end 52. The reflected wave reaches the valve or nozzle 27 of the condition responsive means 10 180° out of phase with the vibration that generated the disturbance and damps the disturbance out.

It is thus apparent that the present principle of applying a quarter-wave length or other odd quarter wave length closed chamber can be utilized in a conventional system for pneumatic control where the air actually passes through the filter 44, to the device and where the filter performs the second function of reflecting the vibrations back to the device providing the control. In this manner no additional equipment beyond that normally supplied in a device, such as a pneumatic thermostat, can accomplish the dual function of supplying a filtered air supply and damping out the vibrations generated without actually applying any mechanical force to the load control element. In the FIGURE 2 an alternate structure is disclosed that encompasses the present invention whereby the quarter-wave length function is provided by a special chamber added to the device. It is thus apparent that many modifications of the present invention are possible and for this reason the applicant believes that the scope of the present invention must be considered solely in light of the appended claims.

I claim:

1. A pneumatic thermostat, comprising: a temperature responsive bimetal controlling a nozzle and said nozzle joined by a tube to a source of control air; said bimetal and said nozzle operating in response to a temperature to be controlled by said nozzle valving said control air; said bimetal and said nozzle having a natural resonant frequency of vibration; said tube having a filter formed of a material of such a density so as to provide a restriction to air flow; and said filter being located in said tube at a fixed distance from said nozzle; said fixed distance being approximately an odd quarter wave length of said natural resonant frequency wherein vibrational waves generated by said nozzle pass into said tube and are reflected by said filter back to said nozzle out of phase with said generated waves to damp out said vibrations.

2. A pneumatic temperature control device, comprising: temperature responsive bimetal means including nozzle means joined by connection means to a source of air; said temperature responsive bimetal means and said nozzle means operating in response to a temperature to be controlled by valving said air; said temperature responsive bimetal means and said nozzle means having a natural resonant frequency of vibration; said connection means having filter means formed of a material of such a density so as to provide a restriction to air flow; and said filter means being located in said connection means at a fixed distance from said nozzle means; said fixed distance being approximately one-quarter the wave length of said natural resonant frequency wherein vibrational waves generated by said nozzle means pass into said connection means and are reflected by said filter means back to said nozzle means out of phase with said generated waves to damp out said vibrations.

3. A pneumatic control device, comprising: condition responsive means including valve means joined by a tube to a source of air; said condition responsive means and said valve means operating in response to a condition to be controlled by valving said air; said condition responsive means and said valve means having a natural resonant frequency of vibration; said tube having a filter formed of a material of such a density so as to provide a restriction to air flow; and said filter being located in said tube at a fixed distance from said valve means; said fixed distance being approximately one-quarter the wave length of said natural resonant frequency wherein vibrational waves generated by said valve means pass into said tube and are reflected by said filter back to said valve means out of phase with said generated waves to damp out said vibrations.

4. A pneumatic control device, comprising: condition responsive means including valve means joined by connection means to a source of air; said condition responsive means and said valve means operating in response to a condition to be controlled by valving said air; said condition responsive means and said valve means having a natural resonant frequency of vibration; said connection means including filter means formed of a material of such a density so as to provide a restriction to air flow; and said filter means being located in said connection means at a fixed distance from said valve means; said fixed distance being approximately an odd quarter wave length of said natural resonant frequency wherein vibrational waves generated by said valve means pass into said connection means and are reflected by said filter means back to said valve means out of phase with said generated waves to damp out said vibrations.

5. A pneumatic temperature control device, comprising: temperature responsive modulating bimetal means including nozzle means connected to a source of air; said temperature responsive bimetal means and said nozzle means operating in response to a temperature to be controlled by said nozzle means proportionally valving said air; said temperature responsive bimetal means and said nozzle means having a natural resonant frequency of vibration; and chamber means having at least one dimension of approximately one-quarter the wave length of said natural resonant frequency connected to said nozzle means and said source wherein vibrational waves generated by said nozzle means pass into said chamber means and are reflected back to said nozzle means out of phase with said generated waves to damp out said vibrations.

6. A pneumatic control device, comprising: condition responsive modulating means including valve means connected to a source of air; said condition responsive means and said valve means operating in response to a condition to be controlled by proportionally valving said air: said condition responsive means and said valve means having a natural resonant frequency of vibration; and tubular chamber means having a length of approximately one-quarter the wave length of said natural resonant frequency connected to said valve means and said source wherein vibrational waves generated by said valve means pass into said tubular chamber means and are reflected back to said valve means out of phase with said generated waves to damp out said vibrations.

References Cited by the Examiner

UNITED STATES PATENTS

| | | | |
|---|---|---|---|
| 1,019,496 | 3/1912 | Larson | 236—87 |
| 1,720,572 | 7/1929 | Riccio | 236—87 |
| 3,071,152 | 1/1962 | Randall et al. | 137—512.1 |

ALDEN D. STEWART, *Primary Examiner.*